United States Patent
Harvey et al.

(10) Patent No.: US 10,696,570 B2
(45) Date of Patent: Jun. 30, 2020

(54) ELECTROCHEMICAL CELL FOR WASTEWATER TREATMENT WITH INCREASED REMOVAL RATES OF POLLUTANTS

(71) Applicant: Axine Water Technologies Inc., Vancouver (CA)

(72) Inventors: David Harvey, Maple Ridge (CA); Barathram Jayasankar, Vancouver (CA); Brendan Wood, Vancouver (CA); Victor Leung, New Westminster (CA); Goran Sparica, Vancouver (CA); Thierry Lebel, Surrey (CA); Alexander Bellemare-Davis, Vancouver (CA)

(73) Assignee: AXINE WATER TECHNOLOGIES INC., Vancouver (CA)

( * ) Notice: Subject to any disclaimer, the term of this patent is extended or adjusted under 35 U.S.C. 154(b) by 0 days.

(21) Appl. No.: 16/070,215

(22) PCT Filed: Jan. 13, 2017

(86) PCT No.: PCT/US2017/013469
§ 371 (c)(1),
(2) Date: Jul. 13, 2018

(87) PCT Pub. No.: WO2017/123969
PCT Pub. Date: Jul. 20, 2017

(65) Prior Publication Data
US 2019/0016616 A1 Jan. 17, 2019

Related U.S. Application Data

(60) Provisional application No. 62/279,631, filed on Jan. 15, 2016.

(51) Int. Cl.
*C02F 1/46* (2006.01)
*C02F 1/461* (2006.01)
(Continued)

(52) U.S. Cl.
CPC .......... *C02F 1/46109* (2013.01); *C02F 1/461* (2013.01); *C02F 1/4672* (2013.01);
(Continued)

(58) Field of Classification Search
CPC ................ C02F 1/46109; C02F 1/4672; C02F 2209/42; C02F 2201/46115;
(Continued)

(56) References Cited

U.S. PATENT DOCUMENTS

| 4,091,176 A | 5/1978 | Alfenaar |
| 4,118,307 A | 10/1978 | LaBarre |

(Continued)

FOREIGN PATENT DOCUMENTS

| WO | 99/01382 A1 | 1/1999 |
| WO | 2005/095282 A1 | 10/2005 |
| WO | 2017/123969 A1 | 7/2017 |

OTHER PUBLICATIONS

Andrade et al., "Degradation of phenol using Co- and Co,F-doped $PbO_2$ anodes in electrochemical filter-press cells," *Journal of Hazardous Materials* 153:252-260, 2008.

(Continued)

*Primary Examiner* — Arun S Phasge
(74) *Attorney, Agent, or Firm* — Seed IP Law Group LLP (57) ABSTRACT

An electrochemical cell for wastewater treatment is disclosed comprising a catalyst coated membrane, an open pore mesh placed next to the catalyst coated membrane, on each side of the membrane, and a compression frame placed next to each of the open pore meshes. The open pore meshes and the compression frames are made of a conductive material.

(Continued)

Each compression frame has compression arms spread within the area delimited by the perimeter of the frame to apply a uniform compression force across the anode and cathode active areas through fasteners which protrude through the compression arms, the open pore meshes and the catalyst coated membrane. A stack comprising at least one such electrochemical cell is immersed in a reactor tank containing the wastewater to be treated.

20 Claims, 4 Drawing Sheets

(51) Int. Cl.
| | | |
|---|---|---|
| | *C25B 11/02* | (2006.01) |
| | *C25B 9/08* | (2006.01) |
| | *C25B 9/20* | (2006.01) |
| | *C02F 1/467* | (2006.01) |

(52) U.S. Cl.
CPC ............... *C25B 9/08* (2013.01); *C25B 9/206* (2013.01); *C25B 11/02* (2013.01); *C02F 2001/46142* (2013.01); *C02F 2001/46157* (2013.01); *C02F 2201/4614* (2013.01); *C02F 2201/46115* (2013.01); *C02F 2201/46135* (2013.01); *C02F 2201/46195* (2013.01); *C02F 2209/42* (2013.01)

(58) Field of Classification Search
CPC .. C02F 2001/46157; C02F 2001/46142; C02F 1/461; C02F 2201/46195; C02F 2201/4614; C02F 2201/46135; C25B 9/08; C25B 11/02; C25B 9/206; C25B 11/035; C25B 9/10
See application file for complete search history.

(56) References Cited

U.S. PATENT DOCUMENTS

| | | |
|---|---|---|
| 4,210,501 A | 7/1980 | Dempsey et al. |
| 4,737,257 A | 4/1988 | Boulton |
| 6,274,028 B1 | 8/2001 | Hu et al. |
| 6,328,875 B1 | 12/2001 | Zappi et al. |
| 6,555,267 B1* | 4/2003 | Broman .............. H01M 8/0273 |
| | | 429/210 |
| 6,852,205 B1 | 2/2005 | Toyoshima et al. |
| 7,704,353 B2 | 4/2010 | Stadelmann et al. |
| 2012/0160706 A1 | 6/2012 | Poirier et al. |
| 2014/0183054 A1* | 7/2014 | Legzdins ................ C02F 1/461 |
| | | 205/343 |

OTHER PUBLICATIONS

Gonçalves et al., "Fabrication and characterization of oxide fine-mesh electrodes composed of Sb—$SnO_2$ and study of oxygen evolution from the electrolysis of electrolyte-free water in a solid polymer electrolyte filter-press cell: Possibilities for the combustion of organic pollutants," *Electrochimica Acta* 121: 2014, 14 pages.

Grimm et al., "Characterization of doped tin dioxide anodes prepared by a sol-gel technique and their application in an SPE-reactor," *Journal of Applied Electrochemistry* 30:293-302, 2000.

Heyl et al., "Electrochemical detoxification of waste water without additives using solid polymer electrolyte (SPE) technology," *Journal of Applied Electrochemistry* 36:1281-1290, 2006.

Murphy et al., "Direct Electrochemical Oxidation of Organics for Wastewater Treatment," *Wat. Res.* 26(4):443-451, 1992.

Shao et al., "A thermally self-sustained micro solid-oxide fuel-cell stack with high power density," *Nature* 435(9):795-798, 2005.

* cited by examiner

ELECTROCHEMICAL CELL FOR WASTEWATER TREATMENT WITH INCREASED REMOVAL RATES OF POLLUTANTS

BACKGROUND

Technical Field

The present invention relates to an electrochemical cell for wastewater treatment with increased removal rates of pollutants, and in particular it relates to an electrochemical cell for the removal of organic and inorganic pollutants comprising a solid polymer electrolyte membrane and an improved current collection and cell compression system.

Description of the Related Art

There is substantial growth in the demand for new wastewater treatment driven by population growth and increased volumes of wastewater produced, tighter wastewater quality regulations, increasing cost of clean water and water shortages, awareness for the protection of clean water sources and replacement of aging wastewater treatment infrastructure. Industries are specifically being forced both by tougher discharge standards and cost pressures to eliminate their recalcitrant wastewater pollutants prior to discharge, and to adopt on-site water reuse and recycling systems to avoid rising water supply and effluent discharge costs. The requirement is for cost-effective, sustainable water treatment systems that do not require the addition of chemicals and do not produce secondary pollution, are compliant with stringent water quality standards, and have minimal operational and maintenance requirements.

Industrial wastewater can contain organic compounds, many of which are toxic, persistent and resist conventional biological and chemical wastewater treatment. The preferred approach to treat recalcitrant wastewater is by non-chemical oxidation techniques that can mineralize the pollutants and reduce the organic load and toxicity of the waste, such as electrochemical oxidation. Electrochemical oxidation is sustainable, safe and has a high treatment efficacy eliminating a wide variety of pollutants such as persistent organic pollutants, dioxins, nitrogen species (e.g., ammonia), pharmaceuticals, pathogens, microorganisms, a majority of priority pollutants and pesticides. Within the area of electrochemical treatment of wastewater there are two primary approaches for the oxidation of pollutants in wastewater. The first method is the direct electrochemical oxidation of organic and/or inorganic pollutants directly on the anode surface. The second method is indirect electrochemical oxidation of organic and/or inorganic pollutants through the in-situ generation of chemically oxidizing species (such as hydroxyl, chlorine, oxygen or perchlorate radicals or compounds such as hypochlorite, ozone, or hydrogen peroxide). These chemically oxidizing species are generated directly on the anode surface and subsequently oxidize pollutants within the wastewater solution. The indirect electrochemical oxidation process is similar to other advanced chemical oxidation processes, such as Fenton oxidation, in that it uses chemical oxidizing species to treat organic and inorganic pollutants; however, the advanced chemical oxidation processes require large amounts of additionally added chemicals and/or feed oxygen, and produce secondary pollution (i.e., sludge or floc) that creates additional costs and requirements for secondary disposal.

A variety of cell configurations that include flow-through parallel plates, divided chambers, packed bed electrodes, stacked discs, concentric cylinders, moving bed electrodes and filter-press have been developed for direct and indirect electrochemical wastewater treatment. However, common to all these electrochemical cell configurations is poor operational efficiency and performance leading to high energy consumption and/or low pollutant removal rates.

In the case of many electrochemical wastewater treatment cells, the wastewater is utilized as the electrolyte, and in the case of divided cells, both as anolyte and catholyte. Due to the, generally, very low ionic conductivity of wastewater, the addition of significant concentrations of supporting chemical electrolytes is required to improve the cell efficiency and obtain reasonable cell voltages. This generally results in need for added anolytes and/or catholytes with base concentrations and pHs that exceed allowable pollutant discharge limits and material compatibilities, thereby adding cost to the treatment for both the disposal of the treated wastewater and the balance of plant costs for handling the added electrolytes. Large electrode gaps and low surface area electrodes are also contributors to efficiency losses and low pollutant removal rates. Slow mass transport in the pores of the porous beds, non-optimized catalyst materials with poor reaction kinetics requiring high electrode overpotentials, and catalysts with low overpotentials for side reactions (e.g., oxygen evolution) also contribute to lower performance and efficiency losses. The use of cell component materials which passivate quickly and increase cell resistivity and instabilities further contribute to efficiency losses. Operating conditions also contribute to efficiency losses; with high mass and ionic transfer losses, at nominal operating current densities, the voltages are too low such that incomplete destruction of organic contaminants occurs and an organic film can form which blocks catalyst sites reducing performance and requiring the use of cell reversal techniques to clean the electrode surfaces.

To increase the performance of electrolytic cells for wastewater treatment published PCT application WO9901382 discloses, for example, adding one or more chemical substances into the fluid to be treated (e.g., an acid, carbon dioxide, an alkali, hydrogen peroxide, or a salt.) In another example, Andrade et al. in J. Haz. Mats. 153, 252-260 (2008) disclose the use of a divided electrolytic cell to treat model phenol wastewater and using a supporting electrolyte of sulfuric acid.

To eliminate the requirement for supporting electrolyte addition, various methods have been developed that reduce the electrode gap in single compartment electrochemical cell configurations. For example, U.S. Pat. No. 6,328,875 discloses the use of porous electrodes allowing wastewater to penetrate through them to flow through the capillary interelectrode gaps. In this prior art document, the electrodes were spaced sufficiently close to provide an interelectrode gap capable of minimizing cell voltage loss and to achieve conductivity without the need of extra supporting electrolytes or current carriers. The interelectrode gap ranged from near zero gap to avoid electrode shorting to about 2 mm which made possible the passage of current through relatively non-conductive media. The wastewater solution flows axially or normal to the longitudinal axis of the plane of the electrodes so that the contaminated aqueous solution simultaneously cascades over and through the electrode stack in a fountain-like effect to maximize contact with electrode surfaces. However, the energy consumption was still high when run without a supporting electrolyte. As illustrated in the examples presented in this prior art document, high voltages were required for operating the electrolytic cell. For example, in an electrolysis cell used in the process of sterilization and chemical oxygen demand (COD) reduction in effluents from food processing plants, the voltage used was between 17.5 and 22 V and in an electrolysis cell used for removing color in a single-pass configuration the voltage used was 25 V.

Another approach to eliminate the requirement for addition of a supporting electrolyte addition is to use a solid polymer electrolyte (SPE) in the electrolytic cell. The SPE technology has been developed for other purposes including for the production of hydrogen by water electrolysis or for generating energy using polymer electrolyte membrane fuel cells.

Generally, an electrochemical cell employing a solid polymer electrolyte (SPE) used for wastewater treatment comprises an anode and a cathode separated by a membrane and two flow field plates for feeding the wastewater to the anode and respectively to the cathode. Such an arrangement is similar with cell designs used in fuel cells and electrolysers. In fuel cells and electrolysis cells, the membrane has to separate the electrolyte flowing on the anode side from the electrolyte flowing on the cathode side. Electrochemical cells used for wastewater treatment are distinguished from fuel cells and electrolysers for hydrogen production in that they do not necessarily require the complete separation of the anode and cathode side. In fuel cells and electrolysers membrane perforations are avoided to prevent the mixing of the anode and cathode streams and gas leakage from and mixing between the anode and cathode compartments should be prevented. Another characteristic of the fuel cells and electrolysers, is that gas and liquid tightness of the assembly is required in such cells in order to ensure that the fluid can move through or across the cell's active area without loss of the pressure. Loss of pressure would result in short circuiting the flow within the active area and subsequent loss of contact between the contaminated wastewater and the catalyst materials.

An example of an electrochemical cell employing a solid polymer electrolyte for wastewater treatment is disclosed in WO03093535, where the dehalogenation of halogenated organic compounds and destruction of nitrates is conducted on the cathode by electrochemical reduction. In this configuration, the anode and cathode compartments are divided by an ion exchange membrane and an anolyte and halogen-containing catholyte are passed through their respective chambers. Although the system allowed operation without supporting electrolytes, in order to operate at low current density (high cell efficiency), an added supporting electrolyte was required in the anolyte and/or catholyte streams.

Murphy et al. in Wat. Res. 26(4) 1992 443-451 also used a SPE electrolytic cell to treat wastewaters with low or negligible supporting electrolyte content. The wastewater was re-circulated through both the anode and cathode. The energy consumption was very high however, and was attributed to low rates of phenol oxidation and side reactions, primarily oxygen evolution from water. J. H. Grimm et al. in J. Appl. Elect. 30, 293-302 (2000) used a SPE electrolytic cell to treat model phenol containing wastewater. The wastewater was pumped through the anode and cathode chambers in series. The energy consumption, however, was also high for phenol removal which was attributed by the authors to the loss in current efficiency due to side reactions such as oxygen evolution. Further, A. Heyl et al. in J. Appl. Electrochem. (2006) 36:1281-1290 investigated a range of SPE electrolytic cell configurations at higher temperatures to de-chlorinate 2-chlorophenol model wastewater. In all cases, the wastewater was pumped across the membrane from either the cathode or anode to the opposite chamber through perforations in the membrane or by assisted electro-osmotic drag of treated membranes. The energy consumption was found to be unpractically high for the untreated membrane, lower for the chemically treated membrane, and lowest for the perforated membrane. However, the best mineralization was obtained with anodic oxidation first followed by cathodic reduction with higher energy consumption.

Still further, another approach for treating low conductivity wastewater without the use of supporting electrolytes was disclosed in WO 2005095282/U.S. Pat. No. 7,704,353. This system uses a solid polymer electrolyte sandwiched between anode and cathode electrodes placed in a single chamber of low conductivity wastewater. The electrodes were, for example, expanded metal grids coated with a doped diamond layer and they were clamped in the direction of the polymeric solid electrolyte by bolts placed at the four corner regions of the assembly formed by the electrodes and the polymeric solid electrolyte in between, the bolts projecting through the electrodes and the solid electrolyte at the edges of the cell. In some embodiments, the electrodes were metal plates coated with a doped diamond layer and the polymeric electrolyte was formed in vertical strips which were arranged at a distance from one another and were placed between the electrodes. The system used in this prior art document relies on a relatively low contact-pressure force of the electrodes being exerted on the polymeric solid electrolyte and on the relatively low mechanical stability of the electrodes. The pressure force is exerted by clamping the two electrodes in the direction of the polymeric solid electrolyte by screw bolts positioned at the four corner regions of the assembly. This arrangement presents the disadvantage that the contact between the polymeric solid electrolyte and the electrode cannot be maintained in certain areas, for example in the center of the assembly, which negatively impacts the operating efficiency of this system. Furthermore the solution involving strips of polymeric solid electrolyte material also reduces the operating efficiency by providing a reduced electrically conductive areas. The energy consumption for pollutant mineralization of this setup was high due to the high voltages required which was indicative of the high resistance losses in this cell assembly, a fact which was not recognized by the applicant.

Another example of an electrochemical cell for treating wastewater from the prior art is disclosed by Goncalves et al. in Electrochimica Acta 121 (2014) 1-14 which describes a SPE (solid polymer electrolyte) filter-press cell employing a Sb—SnO2 electrode where the oxide layer is supported on a stainless steel fine mesh substrate. In order to obtain the desired configuration for the SPE cell, a stainless steel mesh was placed between the electrodes (anode and cathode) and perforated current collectors made of stainless steel were used to ensure a uniform distribution of pressure applied on the SPE through springs fixed at the edges of the current collectors. A pressure of 0.5 kgf $cm^{-2}$ was applied by fastening spring loaded screws fixed in the current collectors in order to promote adequate mechanical/electrical contact at the electrode/SPE/water interface. The spring loaded screws were affixed at the edges of the current collectors, surrounding the active area. The disclosure states that "this procedure ensured adequate compression of the SPE, providing the necessary conditions for the zero-gap" and that "this also prevented membrane rupture". The assembly was immersed in water. This prior art document concludes that the use of an SPE filter-press reactor was incapable of preventing electrode deactivation, i.e., the electrodes were deactivated by a progressive reduction in electrical conductivity within the oxide bulk.

The metallic support used in this filter press was stainless steel instead of titanium which might have caused the electrode deactivation and poor performance. Another cause for the poor performance of this cell, which was not recognized by the authors, might be the use of perforated current collectors which, similar to flow fields in fuel cell- or electrolyser-like assemblies, can result in a high level of catalyst deactivation due to the blockage of the catalyst reaction sites under the solid sections of the plates. The filter press presented by Goncalves et al. could not be scaled up to achieve treatment of higher volumes of wastewater because of its compression system which employs spring loaded screws only at the edges of the active area. This was done for the purpose of preventing the membrane rupture. In a scaled up system such a compression system would induce larger gaps between the electrodes in the parts of the active area which are further away from the edges (e.g., in the center of the active area).

Notwithstanding the substantial developments in the art, there remains a continuing need for a wastewater treatment system having higher rates of pollutant removal, better faradaic efficiency with a small electrode gap across substantially the entire active area of the cell and a high surface area catalyst layer in contact with the solid electrolyte, and which can operate at variable effluent concentrations and can be scaled up from small volumes of treated wastewater (several milliliters) to high volumes (thousands of liters). The present invention addresses this need while additionally providing other benefits as disclosed herein.

BRIEF SUMMARY

The present invention describes an electrochemical cell for wastewater treatment comprising a solid polymer electrolyte membrane, an anode catalyst layer adjacent to a first side of the solid polymer electrolyte membrane and a cathode catalyst layer adjacent to a second side of the solid polymer electrolyte membrane, opposite to the first side. The electrochemical cell further comprises a first open pore mesh adjacent to the anode catalyst layer and a second open pore mesh adjacent to the cathode catalyst layer and a first compression frame, adjacent to the first open pore mesh and a second compression frame, adjacent to the second open pore mesh, each of the compression frames having compression arms spread within the area delimited by the perimeter of the frame, the compression arms being connected to each other at connection sites. Fasteners protrude through holes provided in the compression arms of the first and the second compression frames at the connection sites and further through holes provided in the first and second open pore meshes and through the solid polymer electrolyte membrane and the anode and cathode catalyst layers. The fasteners provide the force to compress the solid polymer electrolyte membrane, the catalyst layers and the open pore meshes between the two compression frames.

In preferred embodiments, the solid polymer electrolyte membrane is provided with holes to allow the penetration of the fasteners.

In preferred embodiments, the anode and the cathode catalyst layers are each deposited on one side of the solid polymer electrolyte membrane to form a catalyst coated membrane (CCM).

In other embodiments, the anode catalyst layer is deposited on one side of the solid polymer electrolyte membrane and the cathode catalyst layer is deposited on the side of an open pore mesh which faces the opposite side of the membrane. Similarly, in other embodiments, the cathode catalyst layer can be deposited on one side of the solid polymer electrolyte membrane and the anode catalyst layer is deposited on the side of an open pore mesh which faces the opposite side of the membrane.

Furthermore, in other embodiments, the anode catalyst layer is deposited on one side of the first open pore mesh and the cathode catalyst layer is deposited on one side of the second open pore mesh, with each side of the open pore meshes which is coated with a catalyst layer facing an opposite side of the membrane.

In preferred embodiments of the present invention, the solid polymer electrolyte membrane has a peripheral portion that extends beyond the catalyst layers and protrudes between the first and the second compression frame to provide the electrical isolation between the two frames.

The fasteners are used for compressing the assembly formed by the membrane, the catalyst layers and the open pore meshes between the compression frames are made of non-conductive materials.

The compression frames of the electrochemical cell of the present invention are made of conductive materials. For example, the compression frames are made of metallic or ceramic materials. In some embodiments, the compression frames can have a thickness of between about 0.5 to about 5 mm.

The open pore meshes in the electrochemical cell described here are made of conductive materials. For example, the open pore meshes are made of metallic or ceramic materials. In some embodiments, the open pore meshes can have thickness of between about 10 to about 5,000 microns.

In the electrochemical cell of the present invention the open pore meshes have a porosity that allows easy access of the wastewater to be treated to the catalyst reaction sites and also allow easy removal of the product gases. In preferred embodiments, the open pore meshes have a porosity of between about 30 to about 95%.

For some wastewater treatment applications, the anode and, respectively the cathode active area of the electrochemical cell can be between about 5 to about 3,500 $cm^2$.

In some embodiments, the solid polymer electrolyte membrane is an anion solid polymer electrolyte. In other embodiments, the solid polymer electrolyte membrane is a cation solid polymer electrolyte.

The present invention also refers to a stack of electrochemical cells for wastewater treatment comprising at least one electrochemical cell described here. For some small scale applications the stack can comprise six or less electrochemical cells. Preferably, a stack of electrochemical cells for wastewater treatment comprises 50 electrochemical cells having the architecture described here. Generally, a stack of electrochemical cells for wastewater treatment can comprise up to 500 electrochemical cells.

The electrochemical cells in a stack are connected through at least one rod and are positioned to create a space between two neighboring electrochemical cells, this space allowing the flow of product gases between the cells.

In some embodiments, the stack comprises several electrochemical cells wherein the anode side of one electrochemical cell is facing the anode side of a neighboring electrochemical cell in the stack. In some other embodiments, the anode side of one electrochemical cell in the stack is facing the cathode side of a neighboring electrochemical cell.

The present invention also refers to a system for the treatment of wastewater comprising at least one stack of electrochemical cells immersed in a reactor tank which contains the wastewater to be treated, the electrochemical cells in the stack having the components and the configuration described here. In the present system for wastewater treatment the stacks are connected either in series or in parallel.

The reactor tank of the present system comprises a lid having gas venting ports through which product gases generated during the stack operation flow to the outside of the reactor tank. Preferably, the reactor tank comprises a level sensor.

A method for wastewater treatment is also described, the method comprising the steps of:
a. providing an electrochemical cell which has the construction described here, the electrochemical cell being immersed in a reactor tank which contains the wastewater to be treated,
b. providing a voltage across the electrochemical cell, and
c. operating the electrochemical cell at a predetermined current density to thereby degrade the pollutant in the wastewater,
wherein the wastewater flows between the compression arms of the compression frames and through the open pore meshes to reach the catalyst layers and to generate the reactions which degrade the pollutant in the wastewater.

In preferred embodiments, the method comprises providing a voltage of about 1.3 to about 10 V across the electrochemical cell. Furthermore, in some embodiments, the method further comprises operating the electrochemical cell at an operating current density of between about 0.05 to about 1.0 A/cm$^2$.

The method of the present invention further comprises taking samples from the wastewater in the reactor tank at predetermined times during the operation of the electrochemical cell and discharging the wastewater to a discharge tank when the samples meet the water purity requirement. The predetermined times for taking the samples from the wastewater in the reactor tank can be determined based on the volume of the wastewater to be treated and on pollutant removal rates which can be determined experimentally.

A method of manufacturing an electrochemical cell for wastewater treatment is also disclosed and the method comprises the steps of:
a. providing a solid polymer electrolyte membrane, an anode catalyst layer adjacent to a first side of the solid polymer electrolyte membrane and a cathode catalyst layer adjacent to a second side of the solid polymer electrolyte membrane, opposite to the first side;
b. positioning a first open pore mesh adjacent to the anode catalyst layer and a second open pore mesh adjacent to the cathode catalyst layer;
c. positioning a first compression frame, adjacent to the first open pore mesh and a second compression frame, adjacent to the second open pore mesh, each of the compression frames being made of a conductive material and having compression arms connected to each other at connection sites and being spread within the area delimited by the perimeter of the frame;
d. inserting fasteners through holes provided in the compression arms of the first and second compression frames at the connection sites, through holes provided in the first and second open pore meshes and through the solid polymer electrolyte membrane and the anode and cathode catalyst layers, and
e. compressing the solid polymer membrane, the first open pore mesh, the second open pore mesh, the first compression frame and the second compression frame at the connection sites through a compression force provided by the fasteners,
wherein the connection sites are distributed within the area delimited by the perimeter of the frame to provide a substantially uniform compression force over an area of the electrochemical cell delimited by the compression frames.

BRIEF DESCRIPTION OF THE SEVERAL VIEWS OF THE DRAWINGS

The drawings illustrate specific preferred embodiments of the invention, but should not be considered as restricting the spirit or scope of the invention in any way.

DETAILED DESCRIPTION

Certain terminology is used in the present description and is intended to be interpreted according to the definitions provided below. In addition, terms such as "a" and "comprises" are to be taken as open-ended. Further, all US patent publications and other references cited herein are intended to be incorporated by reference in their entirety.

Herein SPE stands for solid polymer electrolyte and can be any suitable ion conducting ionomer (either of anion or cation, organic or inorganic form), such as Nafion®. A SPE electrochemical cell is thus a cell comprising a SPE as the electrolyte to which electrical energy is supplied to effect a desired electrochemical reaction (with a positive voltage being applied to the anode of the cell).

Herein, unless otherwise specified, when referring to a numerical value the term "about" is intended to be construed as including a range of values within plus or minus 10% of the value being referred to.

The electrochemical cell of the invention employs a novel architecture to achieve higher removal rates of pollutants by substantially reducing the electrode deactivation which is generally caused by the gas accumulation at the catalyst reaction sites, by achieving a close contact/zero gap between the solid polymer electrolyte membrane and the electrodes throughout the entire anode and cathode active areas due to a substantially uniform distribution of the compression force and by substantially reducing the concentration drop of the polluted water by allowing easier water access to the active area of the catalyst layer.

Figure 1:
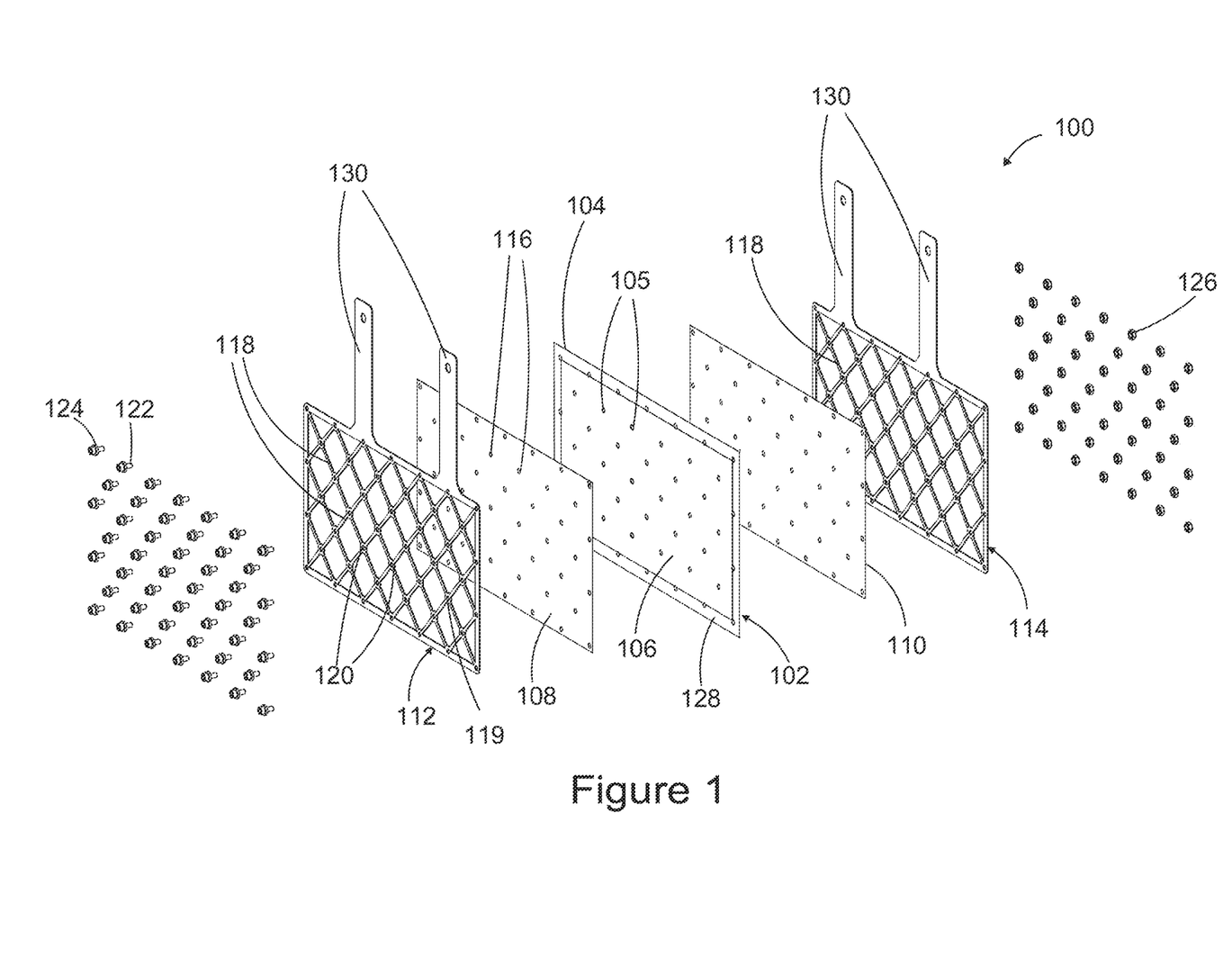
FIG. 1 illustrates an exploded view of an electrochemical cell for wastewater treatment according to the present invention.

An exemplary electrochemical cell for wastewater treatment according to the present invention is illustrated in its exploded view in FIG. 1. Electrochemical cell 100 comprises a catalyst coated membrane 102 (CCM) which consists of a solid polymer electrolyte membrane 104 coated with a catalyst layer 106 on each of its two sides. Only one catalyst layer 106 on a first side of the membrane is shown in FIG. 1, for example this could be the anode catalyst layer, but a person skilled in the art would easily understand that the opposite side of the membrane is also coated with a catalyst layer, which in this example would be the cathode catalyst layer, and which can have substantially the same area as the anode catalyst layer. In this context, in the present disclosure, the anode active area of the electrochemical cell is defined as the area of the membrane (or of the open pore mesh as further described below in alternative embodiments) coated with a catalyst layer on the anode side and the cathode active area is defined as the area of the membrane (or of the open pore mesh) coated with a catalyst layer on the cathode side. In the illustrated embodiment, the solid polymer electrolyte membrane 104 is provided with holes 105 which allow the penetration of fasteners 122 through the membrane during the assembly of the electrochemical cell as further described below. In alternate embodiments, solid polymer electrolyte membrane 104 is not prefabricated with holes and, in this case, the fasteners penetrate the membrane during the assembly process of the electrochemical cell as further explained below. The electrochemical cell further comprises open pore meshes 108 and 110, which are placed next to the catalyst coated membrane 102, on each side of the CCM, and compression frames 112 and 114, which are each placed next to the open pore meshes 108 and respectively 110. Open pore meshes 108 and 110 are meshes provided with open pores to allow a relatively large porosity of the mesh as further described below and they are also provided with holes 116 which allow the penetration of fasteners 122 during the assembly of the electrochemical cell. The area of each of the open pore meshes 108 and 110 is substantially the same as the anode and respectively the cathode active area of the electrochemical cell which is the catalyst coated area of the membrane, i.e., the area of each of the catalyst layers 106. Area 128 of the CCM is not coated with catalyst and has an electrical isolation function as further explained below.

Compression frames 112 and 114, which in the illustrated example have the shape of a rectangle with four sides, are each provided with compression arms 118 connected to each other at connection sites 120 and being spread within the area between the four sides of the compression frame. Holes 119 are provided in the compression frames at connection sites 120 for allowing the penetration of fasteners 122 during the assembly of the electrochemical cell. The connection sites are distributed within the area between the four sides of each compression frame. Compression frames 112 and 114 are provided with leads 130 to make electrical connections with the power supply, generally a DC power supply. A person skilled in the art would understand that the compression frames 112 and 114 can have a different shape than the rectangular shape illustrated in the present figures and the compression arms 118 and connection sites 120 are distributed for each compression frame within the area delimited by its perimeter. In the case of a compression frame of a rectangular shape the perimeter of the frame is defined by its sides.

In FIGS. 1 through 4, fasteners 122 are illustrated as threaded bolts which cooperate with nuts 126 to ensure the required compression force, but a person skilled in the art would easily understand that any other fasteners, for example rivets can be used for providing the compression force exerted by the compression frames on the open pore meshes and on the CCM and such fasteners might not require any additional elements such as nuts 126 for ensuring the required compression force.

The SPE membrane 104 provides a reduced gap between the electrodes (the catalyst layers on the anode and cathode side of the membrane) due to the present compression system. In the present invention, there are no gas diffusion layers to support the catalyst layers and the electrodes comprise only the anode and the cathode catalyst layers 106, each deposited, in this embodiment, on one side of the membrane, which also contributes to a lower operating cost. Open pore meshes 108 and 110 provide the local current collection and, due to their relatively high porosity, allow easy access of the polluted water and of treated water to and from the reaction sites on the catalyst layers and easy removal of the gases formed next to the catalyst layer. Compression frames 112 and 114 allow the perimeter current collection for open pore meshes 108 and 110 and their compression arms 118 achieve a substantially uniform compression of the open pore meshes, of the membrane and of the catalyst layers across the entire anode and respectively cathode active area mainly due to the distribution of the compression arms and respectively of the connection sites. Compression frames 112 and 114 are made of conductive metals or ceramics with a thickness of 0.5 to 5 mm, for example. A person skilled in the art would understand that the number of connection sites and the aspect ratio of the compression frames can vary and can be configured to allow a substantially uniform compression of the open pore meshes and of the CCM and to accommodate different sizes of commercially available solid polymer membranes.

Open pore meshes 108 and 110 have a relatively high porosity for the purposes mentioned above. In the context of the present invention, porosity is defined as the ratio between the open area and the volume of the mesh. Types of meshes that can be used include but are not limited to a sintered titanium fibre mesh supplied by Bekaert having a mesh thickness of between 250 to 550 microns, a fibre diameter of between 22 to 50 microns and a porosity of 50 to 85% and an expanded metal mesh supplied by Dexmet having a mesh thickness of between 10 to 5,000 microns, a strand width of between 0.04 to 0.055 inches with a porosity of between 30 and 95%, with about 33 to 493 openings per square inch and with diamond shaped openings having dimensions of between 0.075 to 0.289 inches for LWD (long way of diamond) and between 0.032 to 0.2 inches for SWD (short way of diamond), where the LWD and SWD are the dimensions of the diagonals of the diamond shaped openings, as explained, for example, on the supplier's website. Preferably open pore meshes are made of conductive metals or ceramics and have a thickness of between 10 to 5,000 microns and a porosity of between about 30 to 95%.

The electrochemical cell is assembled together by compressing the CCM 102 between the open pore meshes 108 and 110 and between compression frames 112 and 114, using fasteners 122 which pass through holes 119 provided in the compression arms 118 at connection sites 120, through the holes 116 provided in the open pore meshes 108 and 110, through the catalyst layers 106 and through the holes 105 provided in the solid polymer electrolyte membrane 104. When solid polymer electrolyte membrane 104 does not comprise any holes, fasteners 122 can penetrate directly through the membrane when the electrochemical cell is assembled. Fasteners 122 can be provided with washers 124 which spread the compression force from the fasteners to compression arms 118 or alternatively can have a shape that allows the spreading of the compression force.

Fasteners 122, washers 124 and nuts 126 are made of non-conductive materials. In the electrochemical cell of the present invention fasteners 122 penetrate through the connection sites, the open pore meshes and the CCM to ensure a substantially uniform distribution of the compression force across the entire active areas of the electrochemical cell and to maintain a reduced gap between the electrodes. This is different than the compression systems described in the existing prior art where the compression of the electrochemical cell is achieved only by the peripheral compression of frames through spring loaded bolts to avoid the penetration of any compression means through the SPE, more specifically through the SPE membrane.

Figure 2:
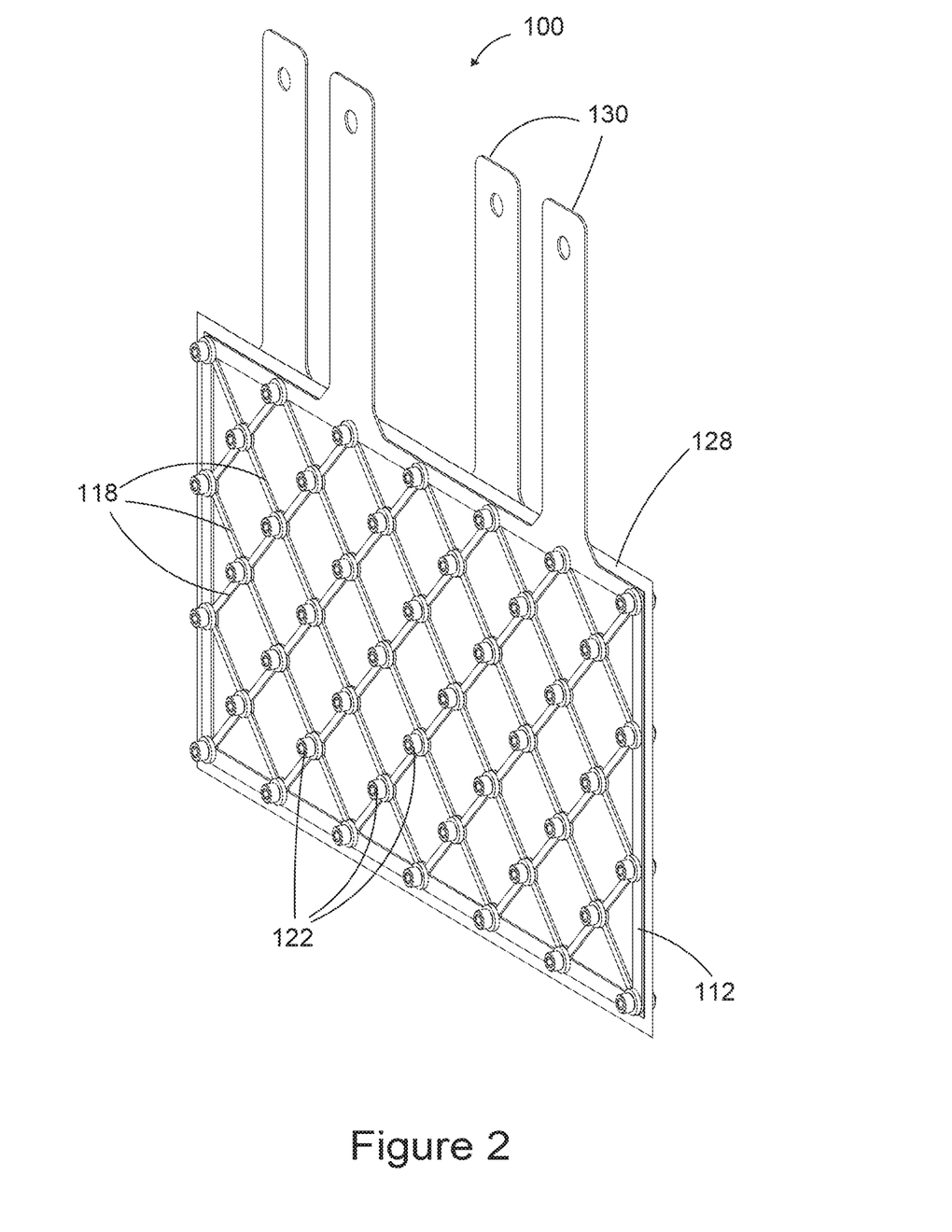
FIG. 2 shows a schematic of an electrochemical cell in its assembled state, where the cell components are compressed between two compression frames and assembled together using threaded bolts and nuts.

An electrochemical cell is shown in its assembled state in FIG. 2. Area 128 of the solid polymer electrolyte membrane, which is not coated with catalyst, protrudes between the compression frames which compress the components of the electrochemical cell and thereby the membrane provides for the electrical isolation between the compression frames.

Figure 3:
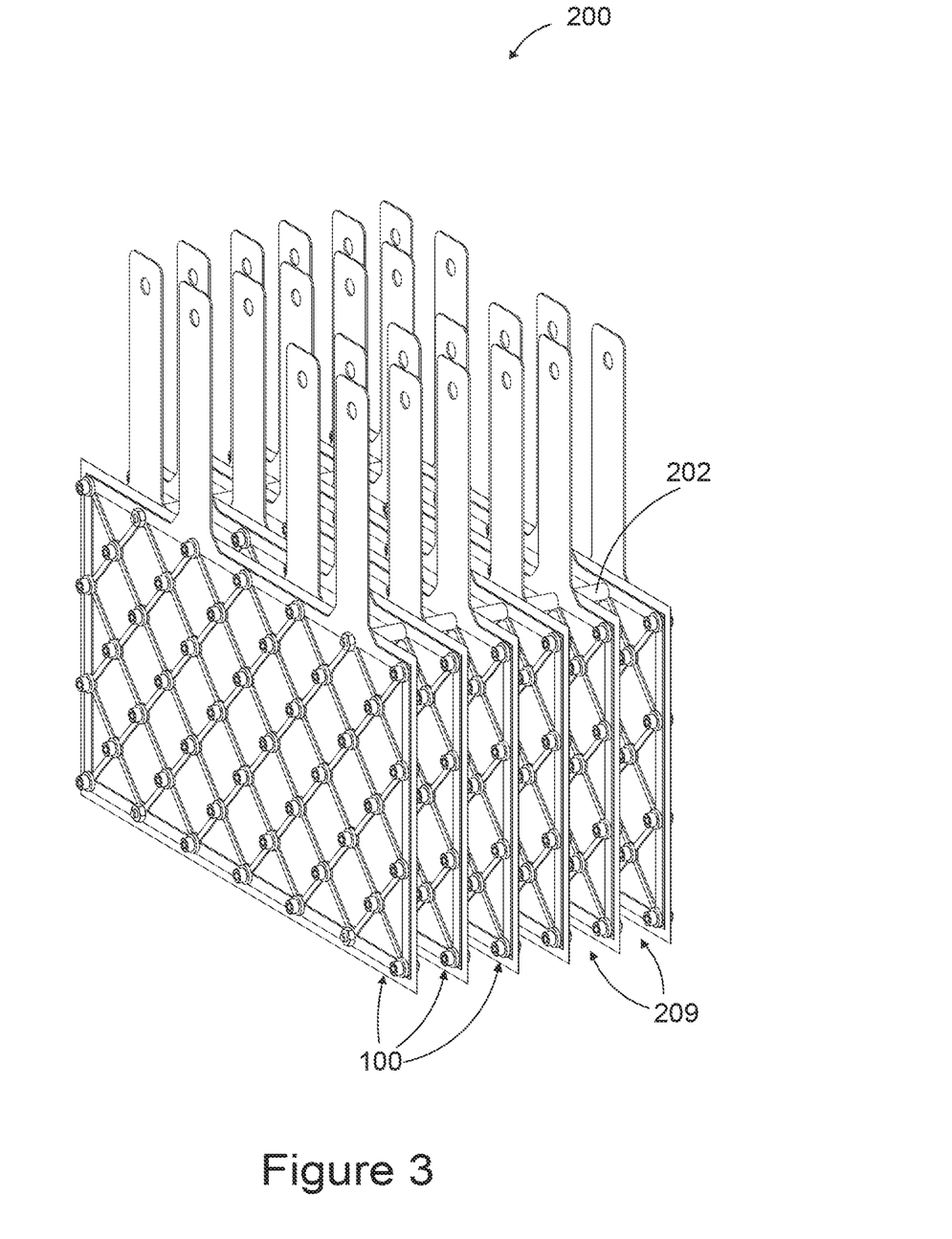
FIG. 3 illustrates a schematic of a stack of electrochemical cells having a construction according to the present invention.

A stack of electrochemical cells is illustrated in FIG. 3. Stack 200 comprises a plurality of electrochemical cells 100 having the same configuration as the one illustrated in FIGS. 1 and 2 and described above. The cells are connected to each other through at least one rod 202 which provides for the required spacing between the individual cells 100. In the illustrated stack two rods were provided for positioning the electrochemical cells at the required spacing. The illustrated stack comprises 6 electrochemical cells, but a person skilled in the art would easily understand that a stack according to the present invention can comprise more electrochemical cells or, for some very small scale applications, less than 6 electrochemical cells. In preferred embodiments, one stack comprises 50 cells, but stacks can comprise up to about 500 individual electrochemical cells.

When assembled in a stack, the electrochemical cells can be arranged such that the anode side of one electrochemical cell is facing the cathode side of the neighbouring cell or such that the cathode side of one electrochemical cell is facing the cathode side of the neighbouring cell and the anode side of one electrochemical cell is facing the anode side of the neighbouring electrochemical cell.

Figure 4:
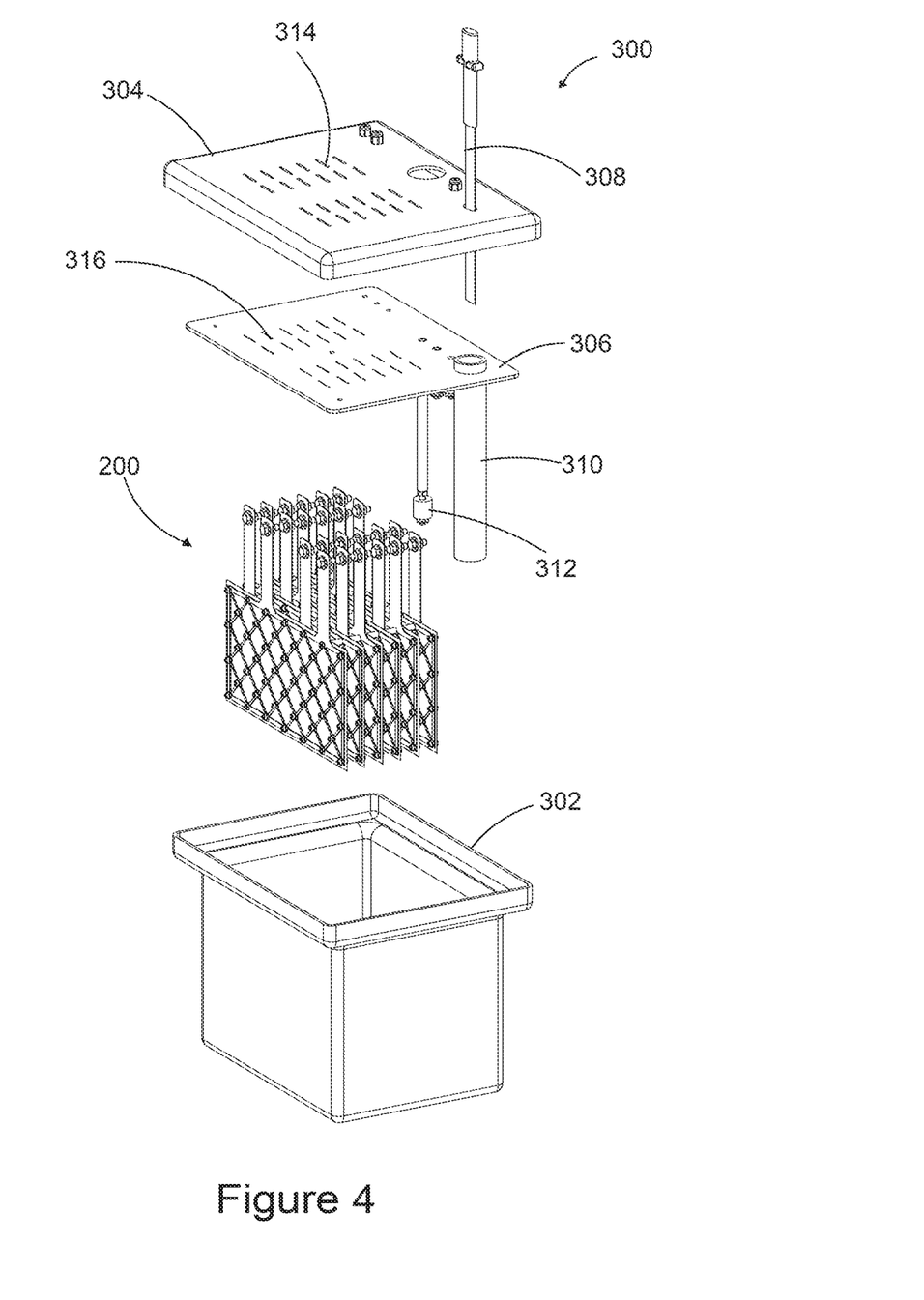
FIG. 4 illustrates an exploded view of a module for wastewater treatment comprising a reactor tank and a stack of electrochemical cells having a construction according to the present invention.

A module 300 for wastewater treatment comprises a stack 200 of electrochemical cells immersed in a reactor tank as illustrated in an exploded view in FIG. 4. Stack 200 is contained within reactor tank 302 such that the electrodes of each of the electrochemical cells in the stack are exposed directly to the wastewater and pollutants. Module 300 further comprises an outer lid 304 provided with feed ports (not illustrated) and gas venting ports 314 and an inner lid 306 which is also provided with feed ports (not illustrated) and gas venting ports 316, both inner and outer lids covering the reactor tank 302 at its upper part to contain the wastewater and stack 200 and to control the emissions from the module. Module 300 is also provided with a level sensor 308 to ensure that the stack operation is halted when the water level is below a desired threshold, which provides protection for the membrane and the electrode system from resistive burnout and non-uniform hydration. Within the reactor tank, level sensor 308 which is used for monitoring the water level within the reactor tank is housed within a tube 310. Module 300 is further provided with a level switch 312 for stopping the flow of wastewater into the reactor tank when the level in the tank reaches a predetermined level.

In a schematic review of the reactions taking place at the individual electrochemical cell level in the stack, the electrochemical oxidation process on the anode falls into the categories of direct, indirect surface mediated, and indirect secondary oxidant mediated oxidation with the specific reactions dependent on the type of SPE used, the choice of catalyst, and the composition of the wastewater solution. A positive charge carrier is transferred using a cation SPE while a negative charge carrier is transferred using an anion SPE. On the anode side, polluted wastewater is exposed to the anode catalyst layer and a step-wise oxidation process takes place, which involves either direct, indirect surface mediated or indirect secondary oxidant mediated oxidation as shown in Equations 1 to 3 for a cation SPE and Equations 6 and 7 for an anion SPE, respectively.

For a cation SPE-based cell, where wastewater (for example wastewater with an ammonia pollutant) is exposed to the anode catalyst layer, a step-wise oxidation process takes place at the anode involving either a direct oxidation, as shown in Equation 1, or an indirect oxidation, as shown in Equations 2(a) and 2(b) or in Equations 3 (a) and 3(b):

Equation 1: Direct oxidation of ammonia (anode half reaction):

Equation 2: Indirect oxidation of ammonia (anode half reaction) via (a) production of hydroxyl surface species from water and (b) oxidation of ammonia via surface hydroxyl species:

(a)

(b)

Equation 3: Indirect secondary oxidant mediated oxidation of ammonia (anode half reaction) via (a) production of hypochlorite species from NaCl and (b) indirect oxidation of ammonia via hypochlorite:

(a)

(b)

For a cation SPE-based electrochemical cell where the anode half reaction is illustrated in Equations 1 or 2, the cathode reaction involves the direct production of hydrogen from protons transported across the SPE, as illustrated in Equation 4:

For a cation SPE-based electrochemical cell where the anode half reaction is illustrated in Equation 3, the cathode reaction involves the direct production of sodium hydroxide via the transport of sodium ions across the SPE, as illustrated in Equation 5(a). The sodium hydroxide then undergoes a subsequent reaction in solution with products of the anode reaction to reform the salt and water, as illustrated in Equation 5(b).

Equation 5:

$$6Na^+ + 6e^- + 6H_2O \xrightarrow[+voltage]{+catalyst} 3H_2 + 6NaOH \quad (a)$$

$$6NaOH + 6HCl \xrightarrow{T,P} 6NaCl + 6H_2O \quad (b)$$

Alternatively, for an anion SPE-based electrochemical cell, where wastewater (in this case an ammonia pollutant) is exposed to the anode catalyst layer a step-wise indirect oxidation process takes place at the anode, involving either hydroxyl surface species or hypochlorite as shown in Equation 6 and Equation 7, respectively:

Equation 6: Indirect oxidation of ammonia (anode half reaction) via surface hydroxyl species:

$$2NH_3 + 6OH^- \xrightarrow[+voltage]{+catalyst} N_2 + 6H_2O + 6e^-$$

Equation 7: Indirect oxidation of ammonia (anode half reaction) via (a) production of hypochlorite species from Cl ions transported across the SPE and (b) indirect oxidation of ammonia via hypochlorite:

$$6Cl^- \xrightarrow[+voltage]{+catalyst} 3Cl_2 + 6e^- \quad (a)$$

$$3Cl_2 + 3H_2O \xrightarrow{pH,T,P} 3HOCl + 3HCl$$

$$3HOCl + 1NH_3 \xrightarrow{pH,T,P} 3H_2O + \frac{1}{2}N_2 + \frac{3}{2}Cl_2 \quad (b)$$

For an anion SPE-based electrochemical cell where the anode half reaction is illustrated in Equation 6, the cathode reaction involves the production of hydroxyl charge carriers and hydrogen from water, as illustrated in Equation 8:

$$6H_2O + 6e^- \xrightarrow[+voltage]{+catalyst} 6OH^- + 3H_2$$

For an anion SPE-based electrochemical cell where the anode half reaction is illustrated in Equation 7, the cathode reaction involves the production of chlorine ion charge carriers and hydrogen from NaCl and water, as illustrated in Equation 9:

$$6H_2O + 6NaCl + 6e^- \xrightarrow[+voltage]{+catalyst} 6NaOH + 3H_2 + 6Cl^-$$

The reactions shown in Equations 1 to 3 and, respectively in Equations 6 and 7 are anode half-reactions and, as a person skilled in the art would know, in many cases there could be numerous intermediate steps in the reactions and as result there could be many intermediate species. However such intermediate species are also oxidized to a final product which typically comprises $CO_2$ for carbon containing pollutants, $N_2$ for nitrogen-containing pollutants and $SO_x$ for sulphur containing pollutants.

At the cathode, pollutants can also be reduced when in contact with the cathode catalyst layer and such reduction reactions may also assist in the stepwise removal of the wastewater pollutants and their oxidation intermediate compounds formed at the anode.

As seen in the above reactions, gases are generated at both the anode and the cathode during the wastewater treatment and wastewaters that have a high concentration of pollutants can generate a substantial amount of gas. In the conventional wastewater treatment systems which use flow plates, the product gases generated during the electrochemical cell operation can accumulate in the flow field channels and therefore they block wastewater access to the catalyst reaction sites generating regions of electrode deactivation.

In the present invention the product gases generated at the anode and cathode can freely flow through the spaces 209 between the individual electrochemical cells, illustrated for example in FIG. 3, and they can accumulate in the headspace provided within the reactor tank 302 to be subsequently vented or captured. In some embodiments, the reactor tank can include a recirculation pump or a stirring mechanism or can use the product gases to help mix the wastewater within the tank.

A wastewater treatment system can comprise more than one module 300. The polluted wastewater is stored in a holding tank from where it is pumped to modules 300 where it is treated for removing the pollutants. If the system comprises more than one module 300, the stacks in modules 300 can be connected in series or in parallel, as illustrated for example in applicant's co-owned United States patent publication number 2015/0298998.

In the embodiments presented here electrochemical cell 100 comprises a catalyst coated membrane (CCM) 102 as illustrated in FIG. 1. In alternative embodiments, the anode and the cathode catalysts layers can be deposited for example on the sides of the open pore meshes which face the membrane when the electrochemical cell is assembled together. Furthermore, in other embodiments, the anode catalyst layer can be deposited on one side of the membrane and the cathode catalyst layer can be deposited on the side of the open pore mesh that is facing the other side of the membrane when the electrochemical cell is assembled together or the cathode catalyst layer can be deposited on one side of the membrane and the anode catalyst layer can be deposited on the side of the open pore mesh that is facing the other side of the membrane when the electrochemical cell is assembled together. In yet another embodiment, the membrane is a cation solid polymer electrolyte whereby the reactions illustrated in Equations 1, 2 or 3 can take place at the anode and the reactions illustrated in Equations 4 or 5 can take place at the cathode and in other embodiments the membrane can be a anion solid polymer electrolyte whereby the reactions illustrated in Equations 6 or 7 can take place at the anode and the reactions illustrated in Equations 8 or 9 can take place at the cathode.

The anode and, respectively the cathode active area of an electrochemical cell can be in the range from about 5 to 3,500 $cm^2$.

In all the embodiments, the anode and the cathode catalysts can comprise a variety of catalyst materials including but not limited to platinum, platinum-derived alloys comprising iridium, ruthenium, rhodium, palladium, cobalt, nickel, iron and iron alloys, copper and copper alloys, mixed metal oxides, diamond, and ceramic-derived catalysts. As known in the art, use of supported catalysts can improve the dispersion of the catalytic materials and thus utilization and also the interaction between certain catalysts and supports can enhance catalytic activity and durability. Examples of catalyst supports that could be used in combination with the list of catalyst materials in the present invention comprise titanium, niobium, nickel, iron, graphite, mixed metal oxides, and ceramics. Anode and cathode catalysts can also comprise stainless steel or graphite.

A method for operating the electrochemical cell of the present invention is also disclosed. The method comprises the steps of:

a. supplying a flow of polluted wastewater to a electrochemical cell, which is electrochemical cell 100 illustrated in FIGS. 1 and 2 described above, whereby electrochemical cell 100 is immersed in a reactor tank 302 which contains the polluted wastewater and wastewater is supplied to both the anode and cathode sides of the electrochemical cell, b. providing a voltage across the electrochemical cell, and c. operating the electrochemical cell to a predetermined current density to thereby degrade the pollutant in the wastewater, wherein the wastewater flows between the compression arms of the compression frames and through the open pores of the open pore meshes to reach the catalyst layers and to thereby generate the reactions which degrade the pollutant in the wastewater.

Samples are taken from the wastewater contained in the reactor tank at predetermined times during the electrochemical cell stack operation and if the sampled water in the reactor tank meets the predetermined purity values the water is removed from the reactor tank into a discharge tank. The predetermined times for taking water samples from the reactor tank are based on the pollutant removal rates obtained for a particular wastewater composition, for example, during experimental tests, and also depend on the volume of wastewater to be treated. The supply and discharge of the wastewater and of the treated water to and respectively from the reactor tank can be done through a pumping system.

In preferred embodiments the operating voltage for a single electrochemical cell ranges between about 1.3 to about 10 V, and the operating current density is between about 0.05 and about 1.0 A/cm$^2$.

A method of manufacturing an electrochemical cell for wastewater treatment as the one described in relation to FIG. 1 is also provided and the method comprises the steps of:

a. providing a solid polymer electrolyte membrane having an anode catalyst layer deposited on a first side of the solid polymer electrolyte membrane and a cathode catalyst layer deposited on a second side of the solid polymer electrolyte membrane, opposite to the first side;

b. positioning a first open pore mesh adjacent to the anode catalyst layer and a second open pore mesh adjacent to the cathode catalyst layer;

c. positioning a first compression frame, adjacent to the first open pore mesh and a second compression frame, adjacent to the second open pore mesh, each of the compression frames having compression arms connected to each other at connection sites and being spread within the area delimited by the perimeter of the frame;

d. inserting fasteners through holes provided in the compression arms of the first and second compression frames at the connection sites, through holes provided in the first and second open pore meshes and through the solid polymer electrolyte membrane and the anode and cathode catalyst layers, and e. compressing the solid polymer membrane, the first open pore mesh, the second open pore mesh, the first compression frame and the second compression frame at the connection sites through a compression force provided by the fasteners, wherein the connection sites are distributed within the area delimited by the perimeter of the frame to provide a substantially uniform compression force over an area of the electrochemical cell delimited by the compression frames.

The advantages of the present electrochemical cell for wastewater treatment and the method of operating it are numerous compared to the solutions from the prior art. Because the electrochemical cell does not comprise any flow field plates and allows easier access of the wastewater to and from the catalyst reaction sites and the flow of product gases through the individual cells towards the top of the reactor tank, electrode deactivation due to gas accumulation is substantially reduced which increases the concentration of pollutants at the surface of the catalyst layer and therefore allows a higher electrical system efficiency with higher pollutant removal rates and eliminates the need for high pressure pumping. Table 1 below summarizes the performance of an electrochemical cell of the present invention for treating wastewater to remove different types of pollutants.

TABLE 1

| Description | Units | Formaldehyde | Ammonia | Methanol | EG |
|---|---|---|---|---|---|
| Catalyst type | — | PGM | PGM | PGM | PGM |
| Concentration | mg/L | 10,000 | 6,400 | 50,000 | 10,000 |
| Treatment objective | % | 65 | 70 | 70 | 70 |
| Continuous Run Time | Hours | 1,200 | 380 | 500 | 120 |
| Average Removal Rate | mg/m$^2$ hr | 123,000 | 58,000 | 415,000 | 98,000 |
| Energy Consumption | kWh/m$^3$ | 71 | 37 | 470 | 175 |

Notes:
PGM stands for platinum group metal catalyst; EG stands for Ethylene Glycol. By comparison, average pollutant removal rates for electrochemical cells using conventional flow field plates is about 6,000 mg/m2 hr for ammonia and 200,000 mg/m2 hr for methanol.

Since the conventional compression hardware at the periphery of the electrochemical cell has been replaced by the compression frames of the present invention with compression arms and connection sites distributed over the entire anode and respectively cathode active area of the electrochemical cell, a substantially uniform compression is achieved which allows a consistent small electrode gap of between about 25 to about 50 microns and a high surface area of the catalyst layer in contact with the solid polymer electrolyte which leads to a high electrical efficiency of this architecture which can also be scaled up to larger electrochemical cells that can operate at variable effluent flow rates of between several milliliters to thousands of liters.

Since the electrical isolation is done by the portion of the SPE membrane that extends beyond the active area of the catalyst layers, no additional isolation layer is required which eliminates the previous failure modes due to the incompatibility of the isolation layer material with the wastewater being treated.

Overall the present system has a low operating cost due to the removal of the flow field plates and of the gas diffusion layers, low energy consumption, lower voltage operation to achieve same level of pollutant removal and can operate at variable effluent flow rates.

The disclosure of U.S. provisional patent application Ser. No. 62/279,631, filed Jan. 15, 2016, is incorporated herein in its entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

The invention claimed is:

1. An electrochemical cell for wastewater treatment comprising:
   a. a solid polymer electrolyte membrane;
   b. an anode catalyst layer adjacent to a first side of the solid polymer electrolyte membrane and a cathode catalyst layer adjacent to a second side of the solid polymer electrolyte membrane, opposite to the first side;
   c. a first open pore mesh adjacent to the anode catalyst layer and a second open pore mesh adjacent to the cathode catalyst layer;
   d. a first compression frame, adjacent to the first open pore mesh and a second compression frame, adjacent to the second open pore mesh, each of the compression frames having compression arms spread within the area delimited by the perimeter of the frame, the compression arms being connected to each other at connection sites;
   e. fasteners which protrude through holes provided in the compression arms of the first and second compression frames at the connection sites, through holes provided in the first and second open pore meshes and through the solid polymer electrolyte membrane and the anode and cathode catalyst layers,
   wherein the fasteners provide a substantially uniform compression force to compress the solid polymer electrolyte membrane, the catalyst layers and the open pore meshes between the two compression frames.

2. The electrochemical cell of claim 1 wherein the solid polymer electrolyte membrane is provided with holes to allow the penetration of the fasteners.

3. The electrochemical cell of claim 1 wherein the anode and the cathode catalyst layers are each deposited on one side of the solid polymer electrolyte membrane.

4. The electrochemical cell of claim 1 wherein the anode catalyst layer is deposited on the first side of the solid polymer electrolyte membrane and the cathode catalyst layer is deposited on a side of the second open pore mesh facing the second side of the solid polymer electrolyte membrane.

5. The electrochemical cell of claim 1 wherein the cathode catalyst layer is deposited on the second side of the solid polymer electrolyte membrane and the anode catalyst layer is deposited on a side of the first open pore mesh facing the first side of the solid polymer electrolyte membrane.

6. The electrochemical cell of claim 1 wherein the anode catalyst layer is deposited on a side of the first open pore mesh facing the first side of the solid polymer membrane and the cathode catalyst layer is deposited on a side of the second open pore mesh facing the second side of the solid polymer membrane.

7. The electrochemical cell of claim 1 wherein the solid polymer electrolyte membrane has a peripheral portion that extends beyond the catalyst layers and protrudes between the first and the second compression frame to provide electrical isolation between the two frames.

8. The electrochemical cell of claim 1 wherein the fasteners are made of non-conductive materials and the compression frames are made of conductive materials.

9. The electrochemical cell of claim 1 wherein the open pore meshes are made of conductive materials.

10. The electrochemical cell of claim 9 wherein the open pore meshes have a porosity of between about 30 to about 95%.

11. The electrochemical cell of claim 1 wherein the solid polymer electrolyte membrane is an anion solid polymer electrolyte or a cation solid polymer electrolyte.

12. A stack of electrochemical cells for wastewater treatment comprising at least one electrochemical cell of claim 1.

13. The stack of claim 12 wherein the electrochemical cells are connected through at least one rod and are positioned to create a space between two neighboring electrochemical cells, the space allowing the flow of product gases between the electrochemical cells.

14. The stack of claim 12 wherein an anode side of one electrochemical cell is facing an anode side of a neighboring electrochemical cell in the stack.

15. The stack of claim 12 wherein an anode side of one electrochemical cell is facing a cathode side of a neighboring electrochemical cell in the stack.

16. A system for the treatment of wastewater comprising at least one stack of electrochemical cells of claim 12 immersed in a reactor tank which contains the wastewater to be treated, wherein the stacks are connected in series or in parallel.

17. A method for wastewater treatment comprising the steps of:
   a. providing at least one electrochemical cell of claim 1 which is immersed in a reactor tank which contains the wastewater to be treated,
   b. providing a voltage across the electrochemical cell, and
   c. operating the electrochemical cell at a predetermined current density to thereby degrade the pollutant in the wastewater,
   wherein wastewater flows between the compression arms of the compression frames and through the open pore meshes to reach the catalyst layers and to generate the reactions which degrade the pollutant in the wastewater.

18. The method of claim 17 comprising providing a voltage of about 1.3 to about 10 V across the electrochemical cell.

19. The method of claim 17 comprising operating the electrochemical cell at an operating current density of between about 0.05 to about 1.0 A/cm$^2$.

20. A method of manufacturing an electrochemical cell for wastewater treatment comprising the steps of:
   a. providing a solid polymer electrolyte membrane, an anode catalyst layer adjacent to a first side of the solid polymer electrolyte membrane and a cathode catalyst layer adjacent to a second side of the solid polymer electrolyte membrane, opposite to the first side;

b. positioning a first open pore mesh adjacent to the anode catalyst layer and a second open pore mesh adjacent to the cathode catalyst layer;
c. positioning a first compression frame, adjacent to the first open pore mesh and a second compression frame, adjacent to the second open pore mesh, each of the compression frames having compression arms connected to each other at connection sites and being spread within the area delimited by the perimeter of the frame;
d. inserting fasteners through holes provided in the compression arms of the first and second compression frames at the connection sites, through holes provided in the first and second open pore meshes and through the solid polymer electrolyte membrane and the anode and cathode catalyst layers, and
e. compressing the solid polymer membrane, the first open pore mesh, the second open pore mesh between the first compression frame and the second compression frame at the connection sites through a compression force provided by the fasteners, wherein the connection sites are distributed within the area delimited by the perimeter of the frame to provide a substantially uniform compression force over an area of the electrochemical cell delimited by the compression frames.

* * * * *